United States Patent
Ho et al.

(10) Patent No.: US 10,692,253 B2
(45) Date of Patent: Jun. 23, 2020

(54) USING A NESTED PIXEL MAP FOR CHART RENDERING OPTIMIZATION

(71) Applicant: Oracle International Corporation, Redwood Shores, CA (US)

(72) Inventors: Pangus Ho, North Billerica, MA (US); Hugh Zhang, Winchester, MA (US); Prashant Singh, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 50 days.

(21) Appl. No.: 15/476,802

(22) Filed: Mar. 31, 2017

(65) Prior Publication Data
US 2018/0286091 A1   Oct. 4, 2018

(51) Int. Cl.
*G06T 11/20* (2006.01)
*G06F 16/332* (2019.01)
*G06F 16/26* (2019.01)
*G06F 16/338* (2019.01)

(52) U.S. Cl.
CPC ............ *G06T 11/206* (2013.01); *G06F 16/26* (2019.01); *G06F 16/338* (2019.01); *G06F 16/3328* (2019.01)

(58) Field of Classification Search
CPC ..... G06T 11/206; G06T 15/005; G06T 15/04; G06T 3/4023; G06T 15/40; G06F 3/0481; G06F 17/30572; G06F 17/30651; G06F 17/30696; G06F 16/26; G06F 16/338; G06F 16/3328
USPC .................................................. 345/440–442
See application file for complete search history.

(56) References Cited

U.S. PATENT DOCUMENTS

| | | | | |
|---|---|---|---|---|
| 2009/0175766 | A1* | 7/2009 | deCorral | G01N 30/8651 422/70 |
| 2011/0242106 | A1* | 10/2011 | Hao | G06T 11/206 345/440 |
| 2013/0088493 | A1* | 4/2013 | Hao | G06T 11/203 345/440 |
| 2014/0267258 | A1* | 9/2014 | Yang | G06T 15/005 345/422 |

(Continued)

FOREIGN PATENT DOCUMENTS

KR   20170107752 A   *   9/2017

OTHER PUBLICATIONS

Kang, Myeong Soo, KR 10 2017/0107752, machine translation.*

*Primary Examiner* — Chante E Harrison
(74) *Attorney, Agent, or Firm* — Trellis IP Law Group, PC

(57) ABSTRACT

Implementations generally relate to using a nested pixel map to optimize chart rendering in a graphical user interface. In some implementations, a method includes generating a first pixel map for a chart, wherein the first pixel map is a first data structure that includes a first group of first data elements, wherein each first data element corresponds to a pixel of a plurality of pixels used to render the chart. The method further includes generating at least one secondary pixel map for the chart. The method further includes determining one or more obscurity states of one or more markers of the chart based on one or more of the first pixel map and the at least one secondary pixel map. The method further includes rendering one or more of the markers in the chart based on the obscurity state of each of the one or more markers.

20 Claims, 12 Drawing Sheets

(56) References Cited

U.S. PATENT DOCUMENTS

| | | | |
|---|---|---|---|
| 2015/0109305 A1* | 4/2015 | Black | G06Q 10/06 345/440 |
| 2016/0080438 A1* | 3/2016 | Liang | G06F 3/04812 715/753 |
| 2016/0260233 A1* | 9/2016 | Jugel | G06T 15/405 |
| 2018/0018517 A1* | 1/2018 | Zhong | G06K 9/00657 |

* cited by examiner

USING A NESTED PIXEL MAP FOR CHART RENDERING OPTIMIZATION

BACKGROUND

Bubble and scatter charts are often used to visualize a large amount of data, where markers such as bubbles show a correlation of two or three different metrics. The rendering time of the markers grows linearly relative to the number of data points for the different metrics. For example, if the number of data points is multiplied by 10, the chart rendering time is also multiplied by 10.

SUMMARY

Implementations described herein use a nested pixel map to optimize chart rendering in a graphical user interface. In some implementations, an apparatus includes one or more processors, and includes logic encoded in one or more non-transitory computer-readable storage media for execution by the one or more processors. When executed, the logic is operable to perform operations including generating a first pixel map for a chart, wherein the first pixel map is a first data structure that includes a first group of first data elements, wherein each first data element corresponds to a pixel of a plurality of pixels used to render the chart. The logic is operable to perform operations including generating at least one secondary pixel map for the chart, wherein the at least one secondary pixel map is a secondary data structure that includes a secondary group of secondary data elements, wherein each secondary data element is associated with a predetermined grouping of the first data elements, and wherein each secondary data element corresponds to a predetermined number of pixels of the plurality of pixels. The logic is operable to perform operations including determining one or more obscurity states of one or more markers of the chart based on one or more of the first pixel map and the at least one secondary pixel map, wherein each marker indicates variable information in the chart. The logic is operable to perform operations including rendering one or more of the markers in the chart based on the obscurity state of each of the one or more markers.

A further understanding of the nature and the advantages of particular embodiments disclosed herein may be realized by reference of the remaining portions of the specification and the attached drawings.

DETAILED DESCRIPTION OF EMBODIMENTS

Figure 1:
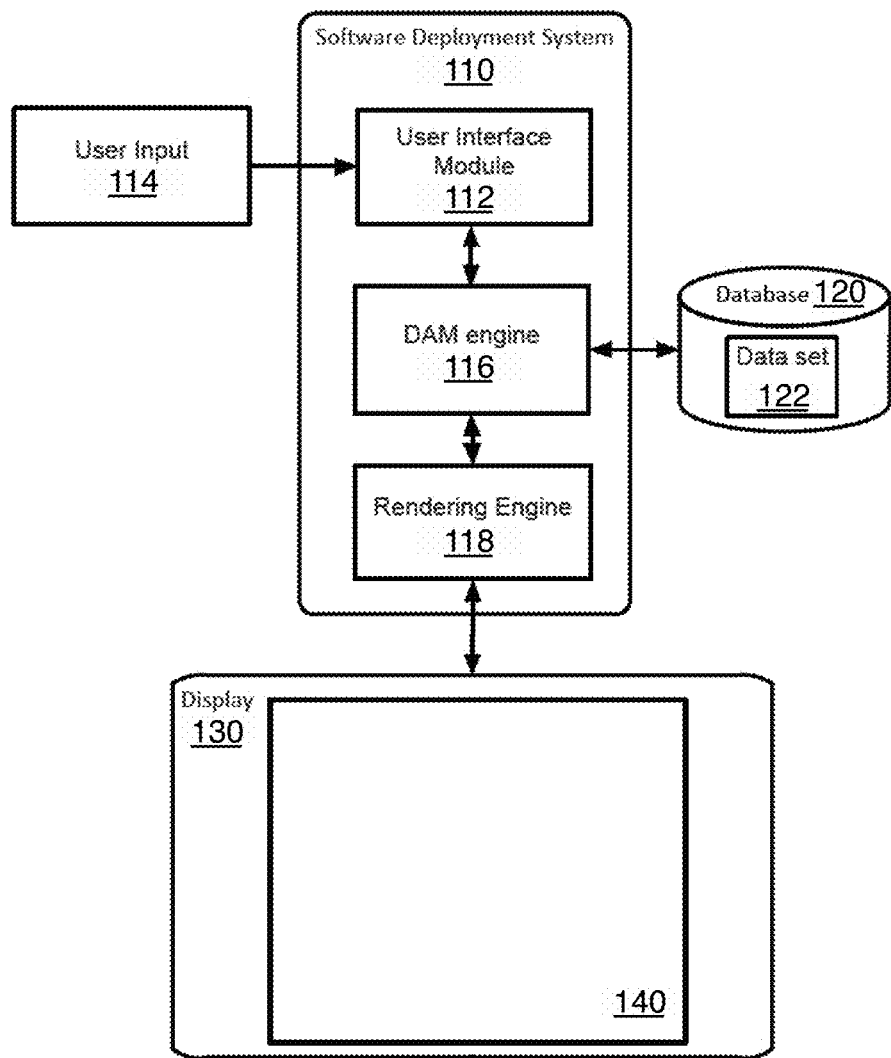
FIG. 1 illustrates an example block diagram of a computing system, which may be used for implementations described herein.

Implementations described herein optimize chart rendering in a graphical user interface by using a pixel map to facilitate in reducing rendering related computations and thereby reducing rendering times of charts.

In various implementations, a system uses a pixel map that keeps track of obscured markers of a chart in a viewport. The pixel map may enable the system to quickly determine which bubble/scatter markers are not completely overlapped by the other markers, such that the system may choose to render only the markers that are fully or partially visible to end users. The nested pixel map may significantly improve the render time of charts such as a bubble charts and scatter charts with large datasets by skipping the rendering of completely obscured markers.

As described in more detail herein, in some implementations, a system generates a first pixel map for a chart (e.g., a bubble chart) having markers (e.g., bubble markers). The first pixel map is a first data structure that includes a first group of first data elements, where each first data element corresponds to a pixel among pixels used to render the chart. The system may also generate a second pixel map, where the second pixel map is a data structure that includes a group of second data elements. Each second data element may be associated with a predetermined grouping of the first data elements, and each second data element corresponds to a predetermined number of the pixels. The system may also generate a third pixel map, where the third pixel map is a data structure that includes a group of third data elements. Each third data element may be associated with a predetermined grouping of the first data elements, and each third data element corresponds to a predetermined number of the pixels. These pixel maps are combined into a nested pixel map.

As described in more detail herein, in some implementations, the system determines obscurity states of one or more markers of the chart based on the nested pixel map. The system may then render markers in the chart based on the obscurity state of each marker. For example, the system may render markers that would be entirely or partly visible to users. The system would not render markers that would be completely hidden from users, due to other markers already occupying the same pixels.

The following are definitions to provide further context and applications of implementations described herein. In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a computing system 100, which may be used for implementations described herein. Computing system 100 provides an interface layer, such as an application program interface (API). The interface layer provides users with seamless connectivity between different instantiations of an application located in different environments (e.g., development environment, production environment, etc.). Computing system 100 may be any computing system, such as an enterprise computing environment, client-server system, and the like.

Computing system 100 also includes software management system 110, also referred to herein as software deployment system 110. Software management system 110 may include a user interface module 112. User interface module 112 may be configured to receive and process data signals and information received from a user interface 114, also referred to herein as user input 114. For example, user interface module 112 may be adapted to receive and process data from user input associated with data for processing via software management system 110. Software management system 110 is configured to process data received from user interface 114, such as a keyboard, mouse, etc. for receiving user input.

Software management system 110 may also include a process engine 116, also referred to herein as digital asset management (DAM) engine 116, and a rendering engine 118. Process engine 116 may be configured as an API or any interface or data structure that may be used to advantage.

In some implementations, computing system 100 may include a data source such as database 120. Database 120 may be connected to the software management system 110 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 120 may contain one or more data sets 122. Data sets 122 may include data as described herein. Data sets 122 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 122 may also contain other data, data elements, and information such as metadata, labels, development-time information, run-time information, configuration information, API, interface component information, library information, pointers, and the like.

In various implementations, software management system 110 is connected to a display 130 configured to display data 140 (e.g., graphical data, etc.), for example, to a user thereof. Display 130 may be a passive or an active display, adapted to allow a user to view and interact with display data 140 displayed thereon, via user interface 114. In other configurations, display 130 may be a touch screen display responsive to touches, gestures, swipes, and the like for use in interacting with and manipulating display data 140 by a user thereof. Gestures may include single gestures, multi-touch gestures, and other combinations of gestures and user inputs adapted to allow a user to convert, model, generate, deploy, and maintain display data 140.

In various implementations, process engine 116 may be adapted to receive data from user interface 114 and/or database 120 for processing thereof. In one configuration, process engine 116 is a software engine configured to receive and process input data from a user thereof pertaining to display data 140 from user interface 114 and/or database 120 in order to provide the process API layer.

Process engine 116 in other implementations may be configured as a data analysis tool to perform analysis functions associated with display data 140. Such analysis functions may include determining attributes associated with the data, partitions, local and remote pods (layers), communication protocols, determining the relationships to other data, interpreting metadata associated with the data, and the like. For example, process engine 116 may be configured to receive and analyze data sets 122 to determine user interface configuration, data processing instructions, data attributes, data hierarchy, nodes, nodal positions within the hierarchy, values, summations, algorithms, source, security, hashes, and the like, associated with data sets 122.

Process engine 116 may receive existing data sets 122 from database 120 for processing thereof. Such data sets 122 may include and represent a composite of separate data sets 122 and data elements pertaining to, for example, organizational data, which may include employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to display data 140, associated data sets 122, and other data associated with display data 140 such as user interface components, icons, user pointing device signals, and the like, used to render display data 140 on display 130. In one exemplary implementation, rendering engine 118 may be configured to render two-dimensional (2D) and three-dimensional (3D) graphical models and simulations to allow a user to obtain more information about data sets 122. In one implementation, upon receiving instruction from a user, for example, through user interface 114, rendering engine 118 may be configured to generate a real-time display of interactive changes being made to display data 140 by a user thereof.

Note that the computing system 100 presents a particular example implementation, where computer code for implementing embodiments may be implemented, at least in part, on a server. However, embodiments are not limited thereto. For example, a client-side software application may implement software management system 110, or portions thereof, in accordance with the present teachings without requiring communications between the client-side software application and a server.

When a bubble or scatter chart has a large dataset (in the order of ten thousand points or more), then many of the bubble or scatter markers will not be visible in the plot area because they are completely covered by the other markers. The key to improving the render time of the chart is by skipping the rendering of those obscured markers. The pixel map keeps track of which pixels in the viewport are covered in order to determine which markers we can skip.

Figure 2:
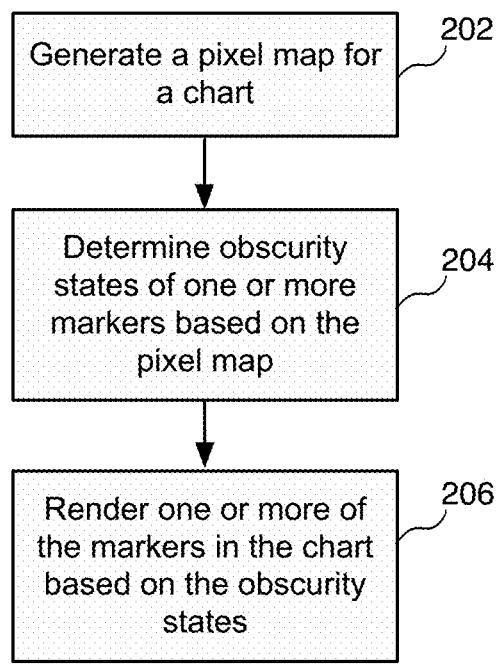
FIG. 2 illustrates an example flow diagram for optimizing chart rendering in a graphical user interface, according to some implementations.

FIG. 2 illustrates an example flow diagram for optimizing chart rendering in a graphical user interface, according to some implementations. In various implementations, a method is initiated at block 202, where a system such as a server generates a pixel map for a chart. This particular pixel map is an un-nested pixel map. As described in more detail herein, this pixel map may be combined or nested with other pixel maps. As described in more detail herein the chart may be a bubble chart or a scatter chart.

Figure 3:
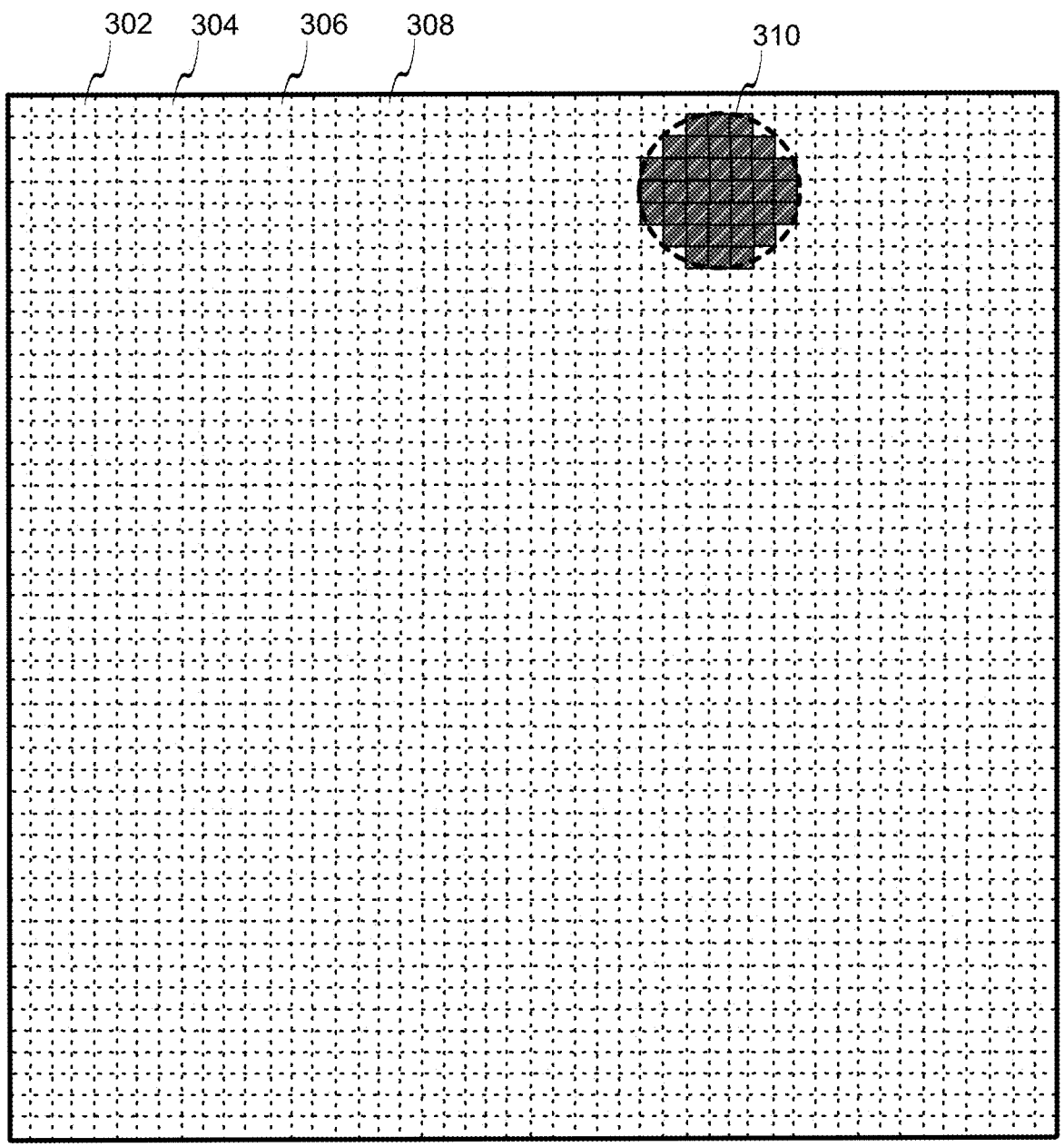
FIG. 3 illustrates an example diagram of a pixel map, according to some implementations.

FIG. 3 illustrates an example diagram of a pixel map 300, according to some implementations. In various implementations, pixel map 300 is a data structure having two-dimensional (2D) array of elements 302, 304, 306, 308, etc. (indicated by dotted squares). In various implementations, each element of the pixel map is associated with and covers one pixel in a chart plot area.

In various implementations, each data element is associated with a corresponding pixel of a set of pixels used to render the chart. As indicated herein, in some implementations, the chart may be a bubble chart, which displays three dimensions or variables of data. As described in more detail herein, a bubble chart includes markers that resemble disks or bubbles, where each marker represents a tuple or triplet of associated values.

In some implementations, values are expressed based on particular locations of the marker (e.g., x-y axis location on the chart). In some implementations, the locations of the marker may be based on a Cartesian coordinate system, or other suitable coordinate system. Another variable may be expressed based on relative size or area of the marker. In an example implementation, an example x-axis variable may be consumer rating, an example y-axis variable may be revenue, and an example area variable may be cost. In another example, the x-axis variable may be age, an example y-axis variable may be income, and an example area variable may be population. The particular variables may vary and will depend on the particular implementation.

Shown is an example data element cluster 310 that represents pixels that are occupied by a marker. In various implementations, the system takes data to be presented in a marker, and computes which pixels the marker would occupy. In this example implementation, the marker is a bubble in a bubble chart. For ease of illustration, data elements corresponding to pixels that are occupied by the marker are indicated by darkened hash marks.

As described in more detail herein, after particular pixels are occupied by a marker, the existing marker that occupies those particular pixels would obscure any new marker placed behind the existing marker.

In various implementations, the system initializes all data elements of the pixel map. In some implementations, the system then initializes all data elements with map values of zeroes ("0"s), where a zero at a given data element indicates that a given pixel associated with that data element is not occupied. In other words, no markers have been rendered at that particular pixel.

As described in more detail herein, after a given pixel is occupied by a marker (e.g., a marker has been rendered at that particular pixel), the system changes the map value of each occupied pixel to a one ("1"). For ease of illustration, data elements having a pixel map value of 1 (corresponding to pixels that are occupied by the marker) are indicated by darkened hash marks.

In various implementations, the system renders markers of a chart in reverse order, such that the top-most marker z-order-wise is rendered first and the bottom-most marker is rendered last. The type of chart may vary depending on the particular implementations. For example, in some implementations, the chart is a bubble chart with bubble markers. In some implementations, the chart is a scatter chart with scatter markers.

At block 204, the system determines obscurity states of one or more of the markers based on the pixel map. For example, the system determines whether the pixel map value is a 0 or a 1. As indicated herein, a pixel map value of 0 at a given data element indicates that the pixel associated with that data element is not occupied, and a pixel map value of 1 at a given data element indicates that the pixel associated with that data element is occupied. In various implementations, each data element that is occupied (pixel map value of 1) represents a rendered pixel in a chart (e.g., bubble or scatter chart). Also, each data element that is unoccupied (pixel map value of 0) represents an unrendered pixel or white space) in a chart.

At block 206, the system renders one or more of the markers in the chart based on the obscurity state of each of the one or more markers. In various implementations, if some of the pixels associated with a given marker are not occupied, those pixels would be available to occupy and display a portion of a marker. The marker would not be in an obscured state. In other words, the marker would be in an unobscured state.

If all of the pixels associated with a given marker are already occupied (such as those pixels corresponding with data element cluster 310 of FIG. 3), those pixels would not be available to occupy and display the given marker. In other words, those pixels would obscure the given marker. The marker would be in an obscured state. Such a marker in an obscured state would be completely behind other already rendered markers.

In various implementations, the system renders the marker if the marker would be fully visible to the end user (e.g., map values for the pixels are all zero), or partially visible (e.g., map values for at least some pixels are zero). If partially visible, the system renders those portions of the marker that are visible and would not render portions of the marker that are obscured.

As indicated herein, after a given pixel is occupied by a marker (e.g., a marker has been rendered at that particular pixel), the system changes the map value of each occupied pixel to 1. If the pixel map value for every pixel that is occupied by the marker is one, it means that the marker is completely obscured by the markers above it. As such, there is no need to render the marker, because it would not be visible to a user. Thus, the system would not render such a marker.

These implementations are improvements over conventional rendering techniques, because obscured markers are not rendered, thereby reducing rendering time. While some implementations are described herein in the context of an un-nested pixel map, these implementations and others may also apply to nested pixel maps. Nested pixel maps may further reduce rendering time by determining early on which markers would be entirely obscured. As such, the system need not check every pixel that such a marker occupies. Thus, the system would not need further analysis and computation for such obscured markers. Implementations directed to nested pixel maps are described in more detail herein.

Figure 4:
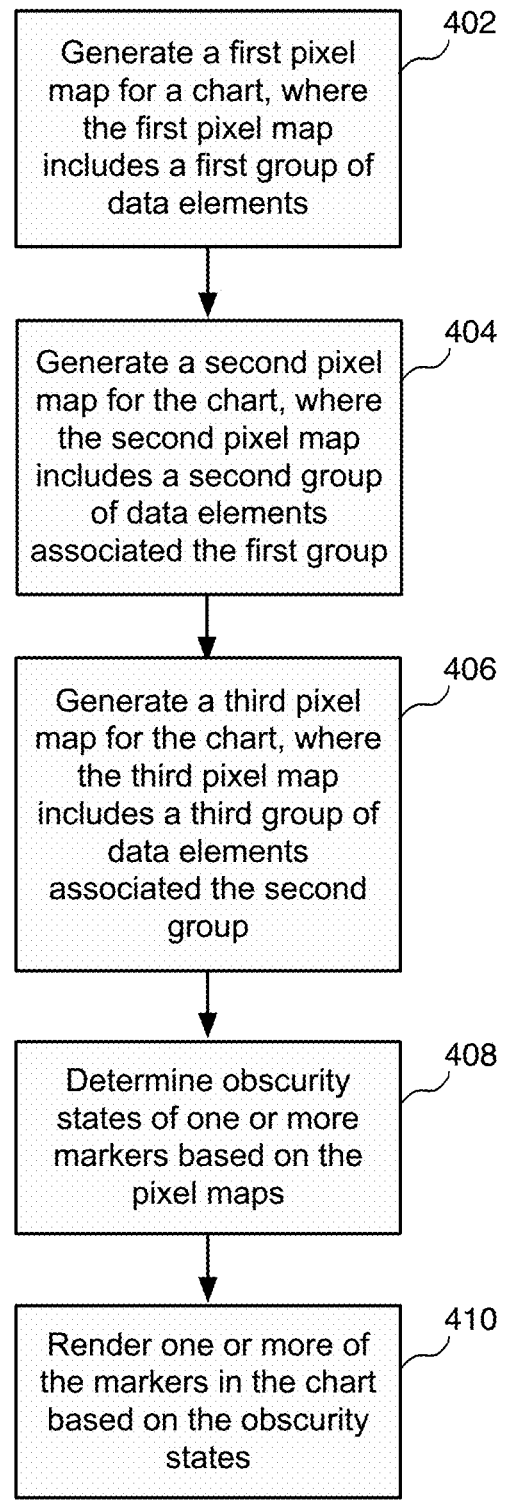
FIG. 4 illustrates an example flow diagram for optimizing chart rendering in a graphical user interface, according to some implementations.

FIG. 4 illustrates an example flow diagram for optimizing chart rendering using a nested pixel map in a graphical user interface, according to some implementations. In various implementations, a method is initiated at block 402, the system generates a first pixel map for a chart. As indicated herein, the first pixel map is a data structure that includes a first group of first data elements. As described in more detail herein, each first data element corresponds to a pixel of the pixels used to render the chart.

Pixel map 300 of FIG. 3 is an example of such a pixel map. As shown in FIG. 3, pixel map 300 includes 2,304 data elements, where each data element corresponds to or covers 1 pixel.

In various implementations, the chart may be bubble chart, where each marker is a bubble in the bubble chart, and each marker indicates variable information in the chart. Various example implementations are described in more detail herein in the context of a bubble chart. While implementations are described herein in the context of a bubble chart, these implementations and others may also apply to scatter charts. For example, in some implementations, the chart may be a scatter chart.

In various implementations, each marker is associated with one or more pixels that each marker would occupy if rendered in the chart. Also, the first pixel map indicates which pixels are already occupied by a marker, as described in connection with FIG. 3.

In various implementations, the system determines a nesting depth D and a scale factor F, where D and F are both positive integers. In some implementations, the nesting depth D is a number of pixels maps to be combined in a nested fashion, and the scale factor F is a number of pixels in a data element of a given pixel map. In the example implementations described herein, the nesting depth D is 3, scale factor is 4. Other values for the nesting depth D and scale factor are possible, depending on the particular implementation. For the example, in some implementations, the nesting depth D may be 2, 4, 5, etc. In some implementations, the scale factor may 2, 3, 5, etc.

At block 404, the system generates a second pixel map for the chart, where the second pixel map is a data structure that includes a second group of second data elements. As described in more detail herein, each second data element is associated with a predetermined grouping of the first data elements. Also, each second data element corresponds to a predetermined number of pixels of the pixels used to render the chart.

Figure 5:
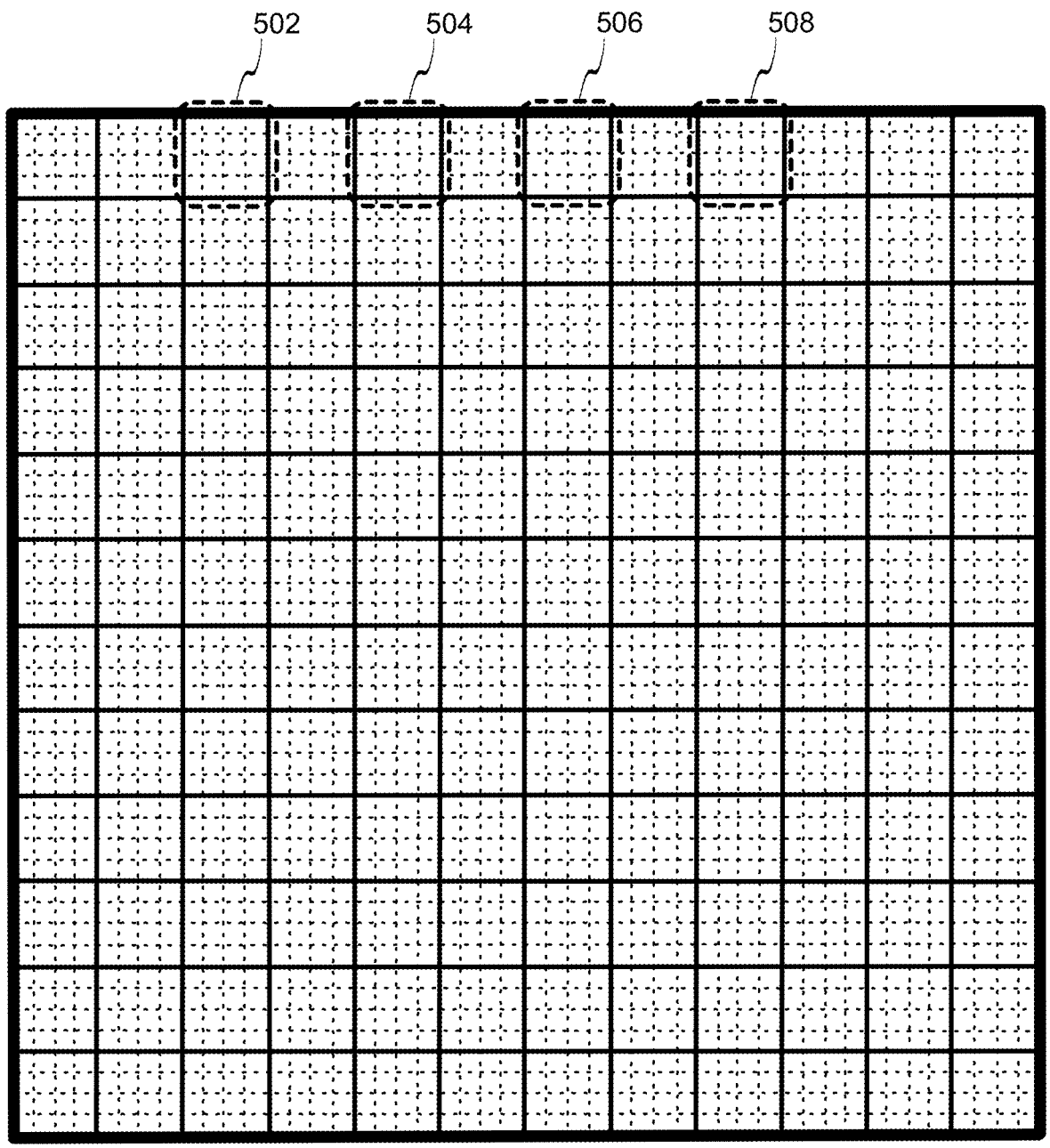
FIG. 5 illustrates an example block diagram of a nested pixel map, according to some implementations.

FIG. 5 illustrates an example block diagram of a nested pixel map 500, according to some implementations. As shown, nested pixel map 500 is a combination of two pixel maps. The two pixel maps are the same size, as in representing the same number of pixels. The two pixel maps, however, have a different number of data elements and different sized data elements. For example, the first pixel map may be represented by pixel map 300 of FIG. 3, where the first pixel map includes 2,304 data elements, and where each data element is associated with 1 pixel.

The second pixel map includes 144 data elements, such as data elements 502, 504, 506, and 508. In various implementations, each data element is associated with 16 pixels each. In some implementations, each element in the second pixel map covers a square area with F by F pixels. In the example pixel map of FIG. 5, each element in the second pixel map covers a square area with 4 by 4 pixels, or 16 pixels.

In various implementations, the second pixel map indicates which groups of pixels are already occupied by a marker. In this particular example, pixel map 500 is a nested pixel map skeleton, where the elements are not yet mapped to markers. For example, the data elements of pixel map 500 shown are initialized to pixel map values of 0 and have not been occupied by any markers. In other words, none of the pixel map values have been incremented to pixel map values of 1.

In some implementations, a pixel map value of a 0 or 1 may be assigned to an individual data element of the second pixel map. For example, referring to data element 502 of pixel map 500, if at least one of the pixels associated with data element 502 is unoccupied, data element 502 would have a pixel map value of 0. If all of the pixels associated with data element 502 are occupied, data element 502 would have a pixel map value of 1. In other words, if all of the data elements of the first pixel map having the same associated pixels have pixel map values of 1, data element 502 would also have a pixel map value of 1.

At block 406, the system generates a third pixel map for the chart, where the third pixel map is a data structure that includes a third group of third data elements. As described in more detail herein, each third data element is associated with a predetermined grouping of the first data elements. As described in more detail herein, each third data element corresponds to a predetermined number of pixels of the pixels used to render the chart. The second pixel map and the third pixel map may also be referred to as secondary pixel maps. Similarly, the second data elements and the third data elements may also be referred to as secondary data elements.

Figure 6:
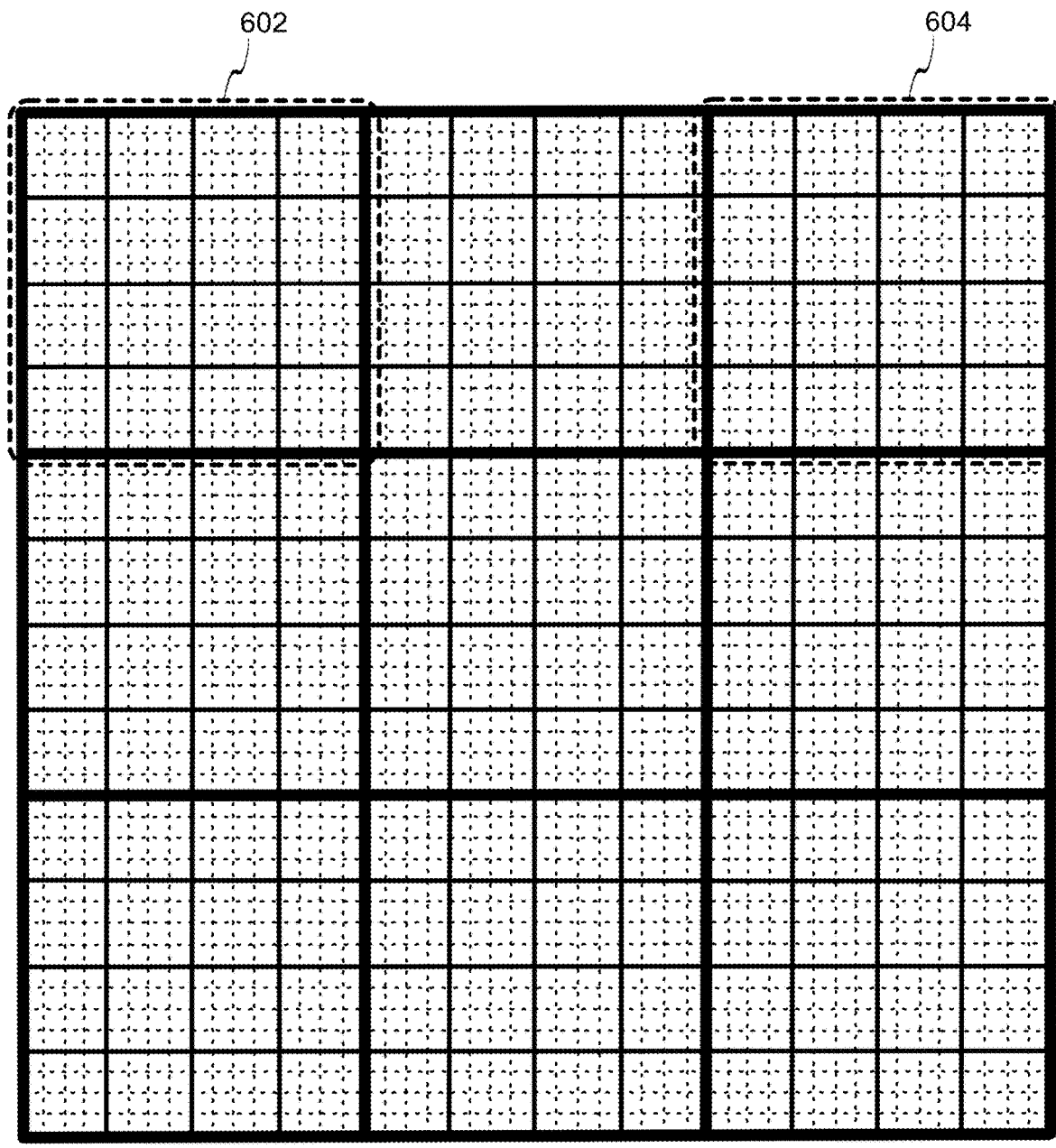
FIG. 6 illustrates an example block diagram of a nested pixel map, according to some implementations.

FIG. 6 illustrates an example block diagram of a nested pixel map 600, according to some implementations. As shown, nested pixel map 600 is a combination of three pixel maps.

The three pixel maps are the same size as in representing the same number of pixels. The three pixel maps, however, have a different number of data elements and different sized data elements. For example, as indicated herein, the first pixel map includes 2,304 data elements, and where each data element is associated with 1 pixel. This first pixel map may be referred to as the innermost pixel map.

The second pixel map includes 144 data elements, where each data element associated with 16 pixels each. This second pixel map may be referred to as the next innermost pixel map, or the next outermost pixel map.

The third pixel map includes 9 data elements, such as data elements 602 and 604. In various implementations, each data element is associated with 256 pixels each. In some implementations, each element in the third pixel map covers a square area with $F^2$ by $F^2$ pixels. In the example pixel map of FIG. 6, each element in the third pixel map covers a square area with $4^2$ by $4^2$ pixels, or 256 pixels. This third pixel map may be referred to as the outermost pixel map.

In various implementations, the third pixel map indicates which groups of pixels are already occupied by a marker. In this particular example, pixel map 600 is a nested pixel map skeleton, where the elements are not yet mapped to markers. For example, the data elements of pixel map 600 shown are initialized to pixel map values of 0 and have not been occupied by any markers. In other words, none of the pixel map values have been incremented to pixel map values of 1.

In some implementations, a pixel map value of a 0 or 1 may be assigned to an individual data element of the third pixel map. For example, referring to data element 602 of pixel map 600, if at least one of the pixels associated with data element 602 is unoccupied, data element 602 would have a pixel map value of 0. If all of the pixels associated with data element 602 are occupied, data element 602 would have a pixel map value of 1. In other words, if all of the data elements of the first pixel map having the same associated pixels have pixel map values of 1, data element 602 would also have a pixel map value of 1.

At block 408, the system determines obscurity states of one or more of the markers of the chart based on the nested pixel map 600. For example, the system determines whether the pixel map value is a 0 or a 1, where a 0 indicates that the pixel associated with that data element is not occupied, and a 1 indicates that the pixel associated with that data element is occupied. If at least one of the pixels associated with a given marker is unoccupied, that given marker is not in an obscured state. If all of the pixels associated with a given marker is occupied, that given marker is in an obscured state.

In various implementations, a particular marker is in an obscured state if all pixels associated with the particular marker are already occupied by another marker. In various implementations, if a larger data element (e.g., data element 602 of FIG. 6) has a pixel map value of 1, the system automatically determines that all smaller data elements associated with the same pixels also have pixel map values of 1. It would be known that a marker whose associated pixels are entirely associated with that larger data element (e.g., data element 602 of FIG. 6) would be in an obscured state. As such, the system need not determine the pixel map values of those smaller data elements, which optimizes system computations and reduces chart rendering times.

In some implementations, for each data element (which potentially covers multiple pixels), a particular data element and any portions of an associated marker are considered obscured if the pixel map value is equal to the number of pixels it covers. For example, a pixel map element covering 4×4 pixels is considered obscured if the pixel map value is 16.

At block 410, the system renders one or more of the markers in the chart based on the obscurity state of each of the one or more markers. In various implementations, a particular marker is rendered if the particular marker is not in an obscured state. In other words, if some of the pixels associated with a given marker are not occupied, those pixels would be available to occupy and display a portion of a marker. The marker would not be in an obscured state. In various implementations, the system renders the marker if the marker would be fully visible to the end user or partially visible. If partially visible, the system renders those portions of the marker that are visible and would not render portions of the marker that are obscured. The partial renderings represent a marker that is viewed as under another top marker that partially blocks the view of the bottom marker.

If all of the pixels associated with a given marker are already occupied, those pixels would not be available to occupy and display the given marker. The marker would be in an obscured state. As such, there is no need to render the marker, because it would not be visible to a user. Thus, the system would not render such a marker. Example implementations of the system rendering markers in the chart are described in more detail herein.

The particular order that the system renders the markers may vary, depending on the particular implementation. For example, in some implementations, the system renders the markers in reverse order, such that the top-most marker z-order-wise is rendered first and the bottom-most marker is rendered last. In some implementations, markers are rendered in the order that their associated data is collected. In other words, markers based on data that was collected first is rendered first, and markers based on data that was collected last is rendered last. In some implementations, larger markers are rendered first, and smaller markers are rendered last.

Figure 10:
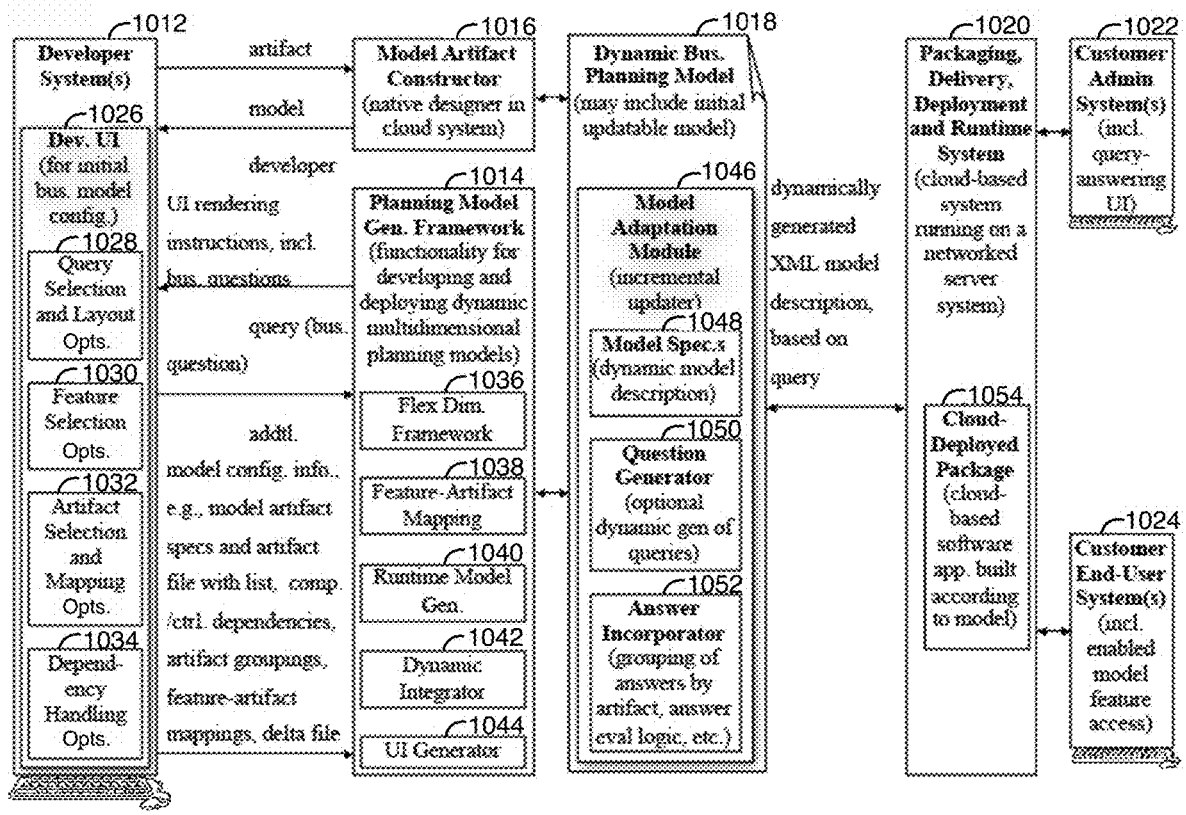
FIG. 10 illustrates an example block diagram of a system, which may be used for implementations described herein.
Figure 11:
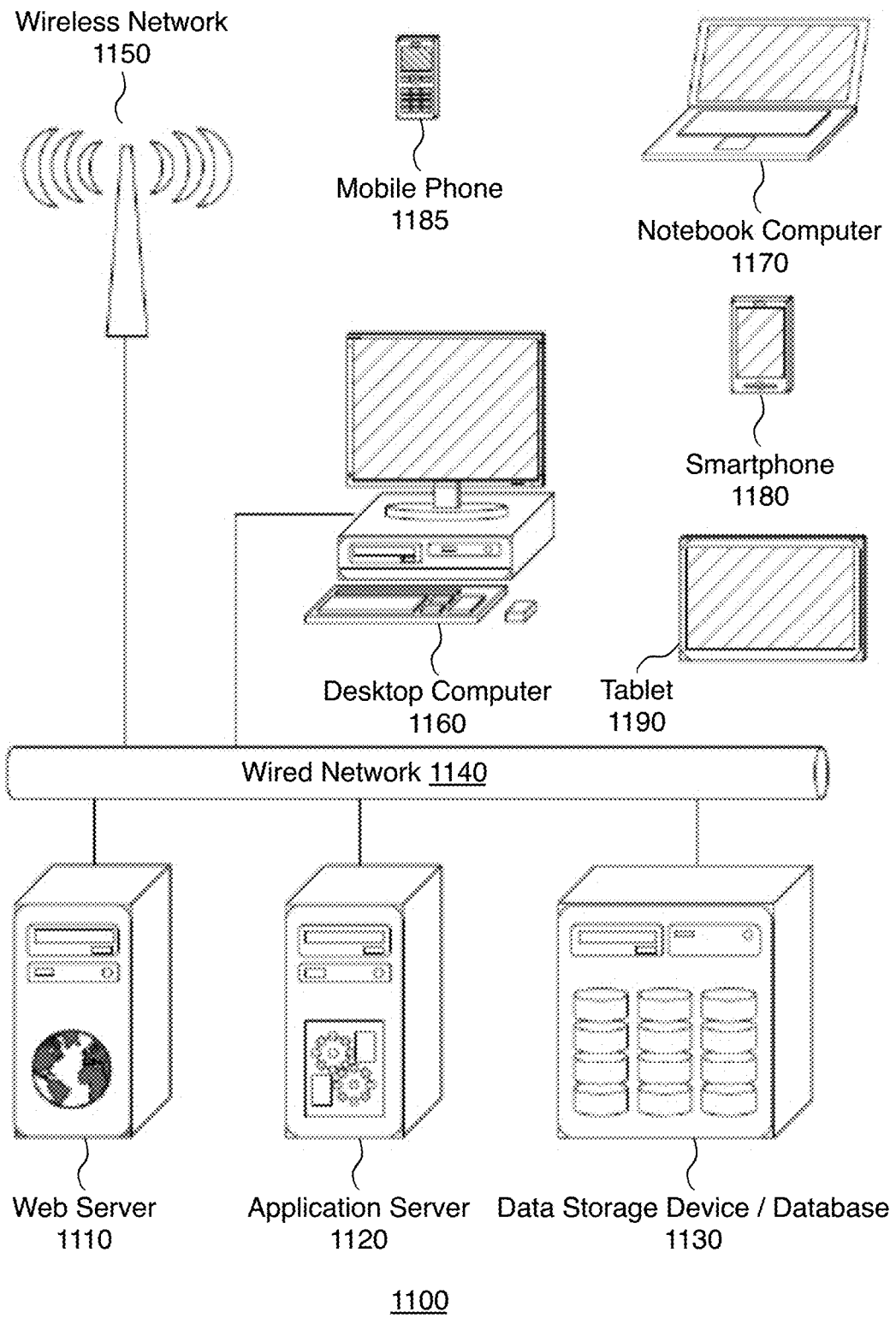
FIG. 11 illustrates an example block diagram of a system, which may be used for implementations described herein.
Figure 12:
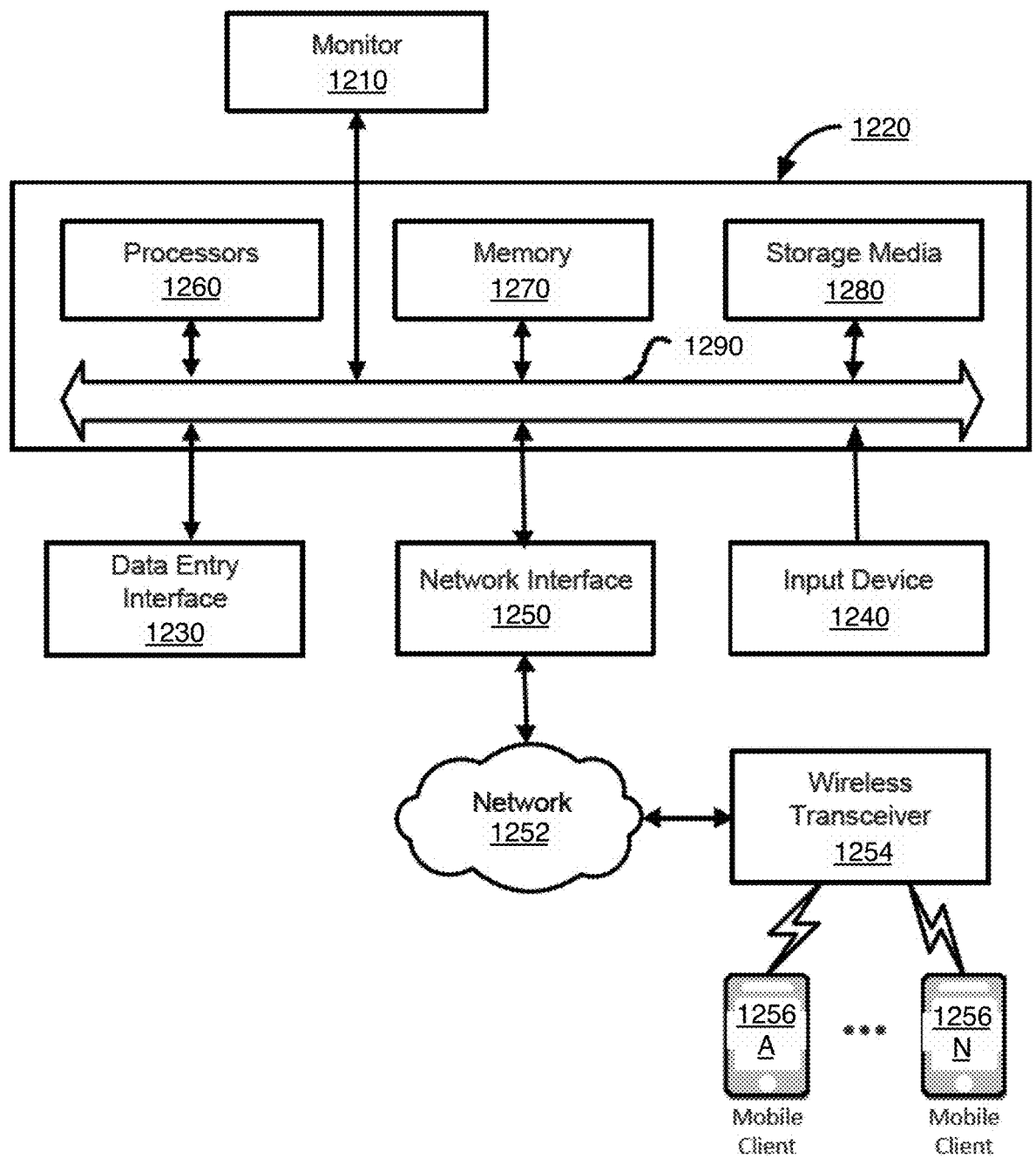
FIG. 12 illustrates an example block diagram of a network environment, which may be used for implementations described herein.

Implementations in connection with FIG. 4 may be performed by components and/or modules of computing system 100 of FIG. 1, system 1000 of FIG. 10, system 1100 of FIG. 11, and/or network environment 1200 of FIG. 12.

Figure 7:
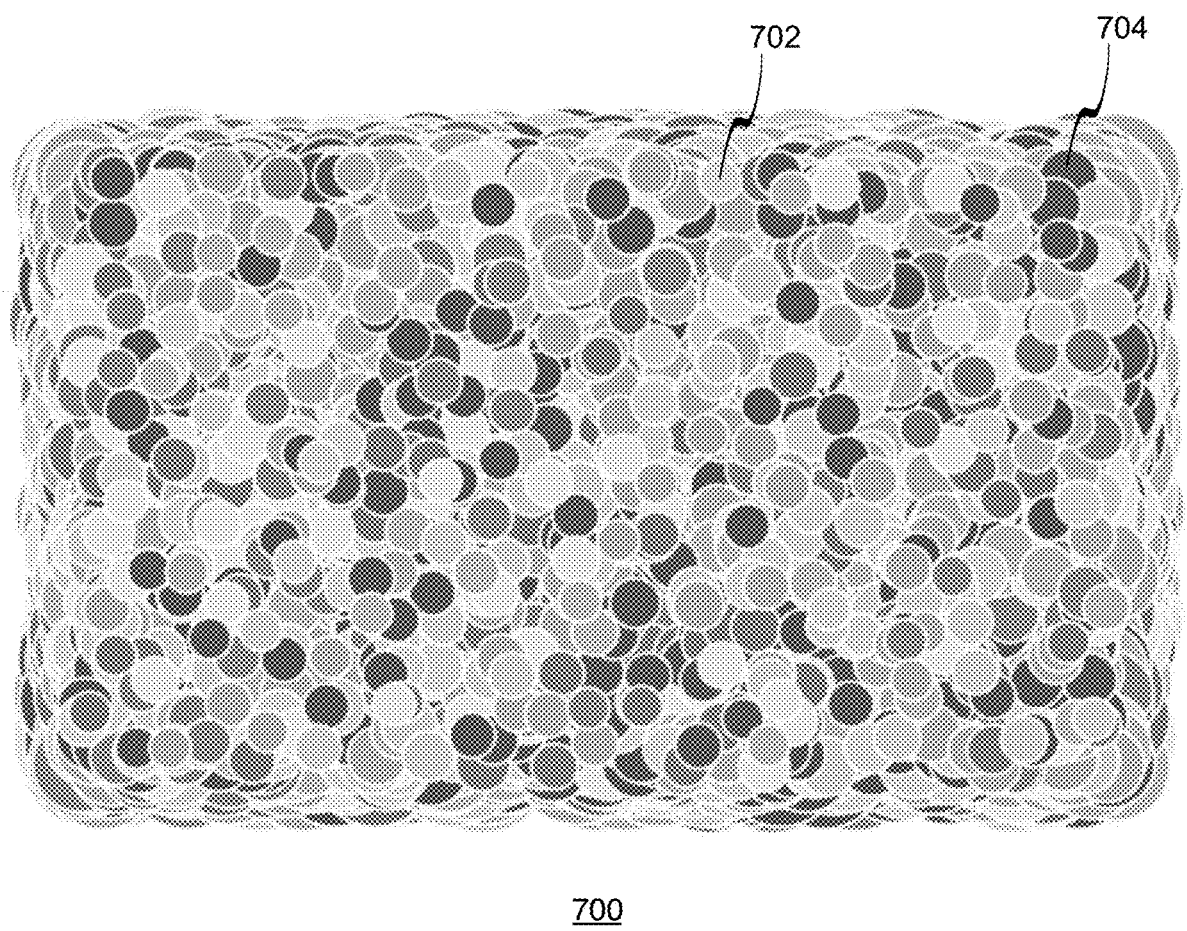
FIG. 7 illustrates an example flow diagram for optimizing chart rendering in a graphical user interface, according to some implementations.

FIG. 7 illustrates an example block diagram of a bubble chart 700, according to some implementations. As shown, bubble chart may have thousands of markers such as markers 702 and 704. The number of visible markers of a given size is roughly a constant for a given chart size. This enables the chart to have an O(1) growth in rendering time. For example, for a 600 px by 400 px bubble chart (a typical chart size in web applications), usually no more than 10,000 markers would be visible if the bubbles are distributed evenly across the entire plot area. The number of visible markers would be even less if the distribution is skewed because there will be more overlaps. In this example implementation, even if the chart receives one million data points, only around 10,000 markers will be rendered, so it caps the maximum render time of the chart.

While some implementations are described herein in the context of bubble charts, these implementations and others also apply to scatter charts. Like a bubble chart, a scatter chart also displays variables of data. The data may be displayed as a collection of points, each having the value of one variable determining the position on the horizontal axis and the value of the other variable determining the position on the vertical axis.

Figure 8:
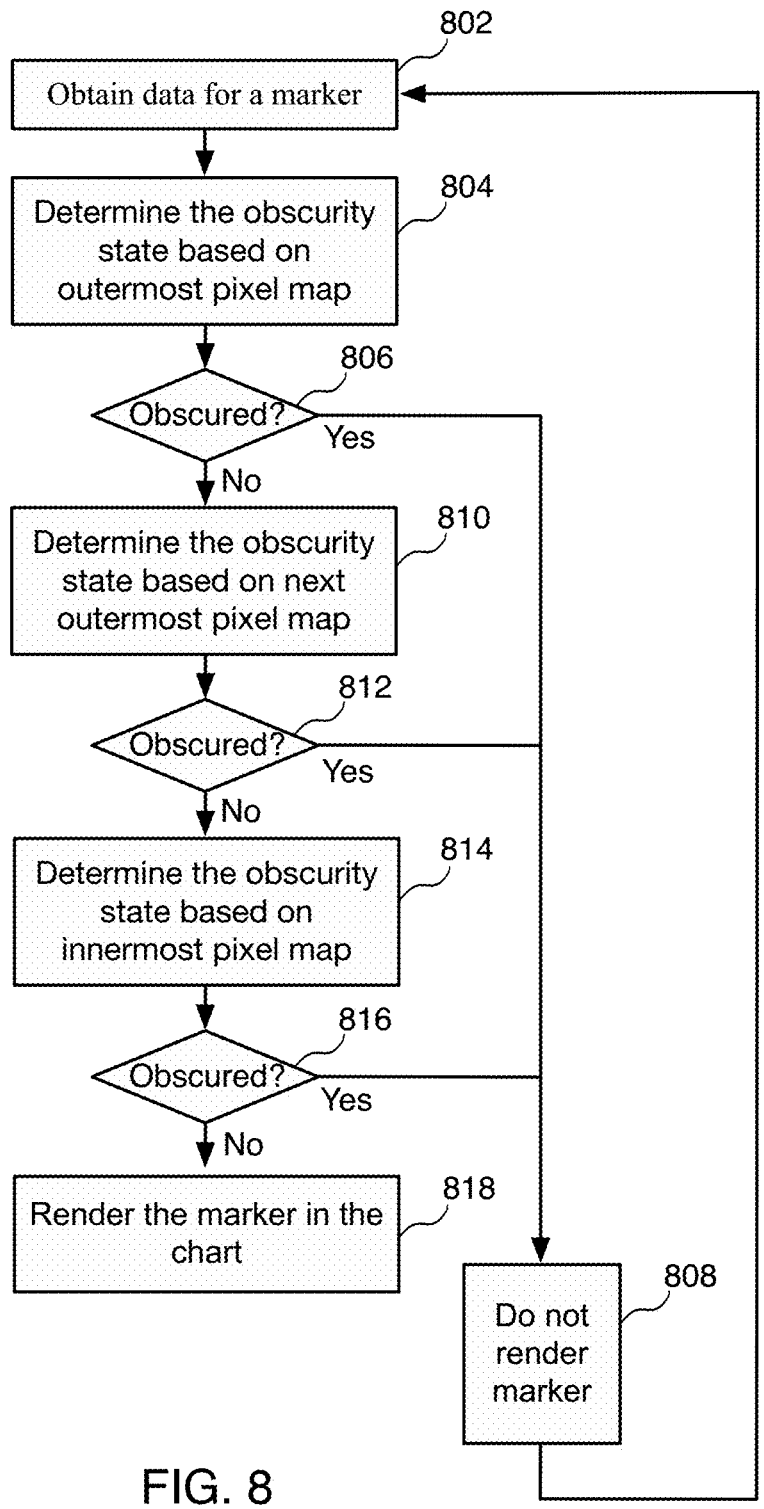
FIG. 8 illustrates an example block diagram of a bubble chart, according to some implementations.

FIG. 8 illustrates an example flow diagram for optimizing chart rendering in a graphical user interface, according to some implementations. The following example implementation applies a nested pixel map such as nested pixel map 600 of FIG. 6.

In various implementations, a method is initiated at block 802, where the system obtains data for a marker. The system may obtain the data from any suitable storage location such as database 120 of FIG. 1 and/or database 1130 of FIG. 11. The system may also procure data via any suitable network such as networks 1140 and/or 1150 of FIG. 11.

At block 804, the system determines the obscurity state of the marker based on the outermost pixel map. As indicated herein, the security state indicates if the pixels associated with the marker are already occupied by other markers.

Figure 9:
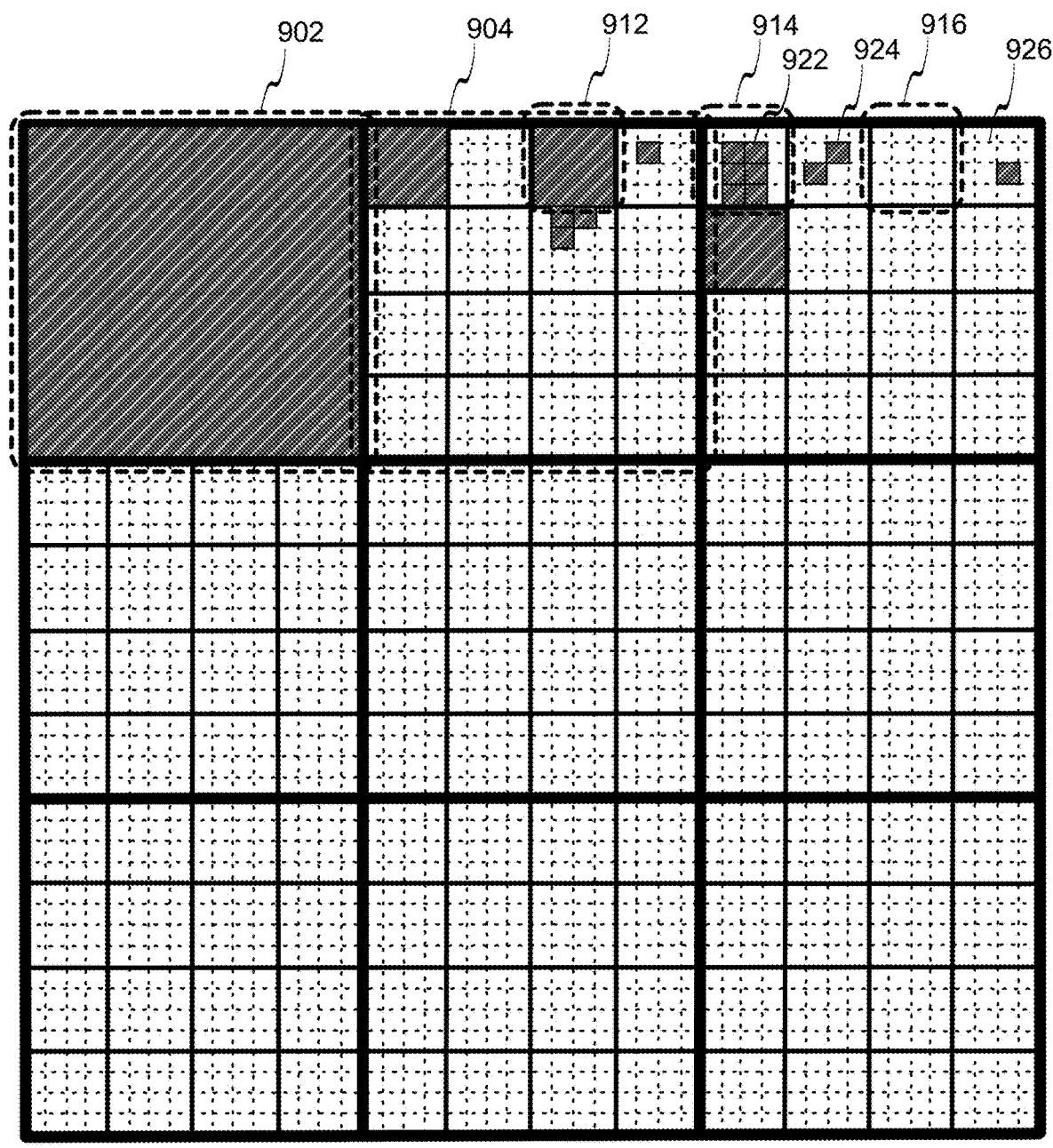
FIG. 9 illustrates an example block diagram of a nested pixel map indicating occupied pixels, according to some implementations.

FIG. 9 illustrates an example block diagram of a nested pixel map 900 indicating occupied pixels, according to some implementations. As shown, nested pixel map 900 includes three combined pixel maps. The outermost pixel map includes 9 data elements such as data elements 902 and 904, which are associated with 16×16 pixels each (indicated by thick bold lines). The next outermost pixel map, or middle pixel map includes 144 data elements such as data elements 912, 914, and 916, which are associated with 4×4 pixels each (indicated by medium bold lines). The innermost pixel map includes 2,304 data elements such as data elements 922, 924, and 926, which are associated with 1 pixel each (indicated by dotted lines).

While various implementations are described in the context of 3 nested pixel maps, the particular number of nested pixel maps may vary and will depend on the particular implementation. Also, while 9 data elements are shown in the outermost pixel map, 144 data elements are shown in the next outermost pixel map, 2,304 data elements are shown in the innermost pixel map, the particular number of data elements in each pixel map may vary and will depend on the particular implementation. Furthermore, while the data elements are shown to be square, the actual shape may vary, and will depend on the particular implementation.

Referring to the outermost pixel map, for each data element for the outermost pixel map (e.g., data elements 902 and 904), the system checks if the pixels associated with the particular data elements are already occupied by another marker, or currently unoccupied and can be occupied by the marker, or if those pixels.

As described herein, the system initializes the pixel maps such that each data element has a pixel map value of zero (0). When a given pixel becomes occupied by a marker, the system increments the pixel map value of the given pixel to value of one (1). For ease of illustration, in FIG. 9, pixels having a pixel map value of 1 are indicated by the darkened hash marks.

For example, referring to data element 902, all of the pixels are already occupied by another marker, as indicated by all data elements having darkened hash marks. In other words, data element 902 has a pixel map value of 256, which is the number of pixels that are occupied.

If a new marker is entirely covered by the pixels of data element 902 (e.g., all pixels that the new marker could potentially occupy are associated with data element 902 only), and if data element 902 has a pixel map value of 256, the new marker would be obscured by one or more other markers. The new marker would be in an obscured state. As such, there is no need for the system to check the inner pixel map. Also, there is no need for the system to render the marker in the chart, because the bubble it represents would be completely obscured by another bubble on top of it.

Referring again to FIG. 8, at block 806, if the marker is in an obscured state, the system does not render the marker at block 808, and the system obtains data for the next marker at block 802. If no markers are left to be rendered, the process ends. This is beneficial to the overall rendering process in that the system ceases further computational and rendering resources with respect to the marker.

At block 806, if the marker is not in an obscured state, the system determines the obscurity state of the marker based on the next outermost pixel map at block 810. The marker is not in an obscured state if the marker would be visible entirely or partly if rendered. In other words, the marker is not in a completely obscured state if any of the pixels associated with the data element that covers the marker are not yet occupied. For example, as shown in example data element 904, not all of the pixels are already occupied by another marker. As shown, the pixels that are unoccupied are indicated by data elements that are not darkened.

Referring to the next outermost pixel map, for each data element for the next outermost pixel map (e.g., data elements 912, 914, and 916), the system checks if the pixels associated with the particular data elements are already occupied by another marker, or currently unoccupied and can be occupied by the marker.

For example, referring to data element 912, all of the pixels are already occupied by another marker, as indicated by all data elements having darkened hash marks. In other words, data element 912 has a pixel map value of 16, which is the number of pixels that are occupied.

If a new marker is entirely covered by the pixels of data element 912 (e.g., all pixels that the new marker could potentially occupy are associated with data element 912 only), and if data element 912 has a pixel map value of 16, the new marker would be obscured by one or more other markers. The new marker would be in an obscured state. As such, there is no need for the system to check the inner pixel map. Also, there is no need for the system to render the marker in the chart.

At block 812, if the marker is in an obscured state, the system does not render the marker, and the system obtains data for the next marker at block 802. If no markers are left to be rendered, the process ends.

At block 814, if the marker is not in an obscured state, the system determines the obscurity state of the marker based on the innermost pixel map. For example, as shown in example data element 914, not all of the pixels are already occupied by another marker. As shown, the pixels that are unoccupied are indicated by data elements that are not darkened. In some implementations, if the system reaches the innermost pixel map, the system proceeds similarly to the un-nested scenario described in FIG. 3.

In various implementations, the marker is not in an obscured state if the marker would be visible entirely or partly if rendered. In other words, the marker is not in an obscured state if any of the pixels associated with the data element that covers the marker are not yet occupied.

Referring to the next innermost pixel map, for each data element for the innermost pixel map (e.g., data elements 922, 924, and 926), the system checks if the pixels associated with the particular data elements are already occupied by another marker, or currently unoccupied and can be occupied by the marker.

For example, referring to data element 922, the pixel is already occupied by another marker, as indicated by the data element having darkened hash marks. In other words, data element 922 has a pixel map value of 1, which is the number of pixels occupied.

If a new marker is entirely covered by the pixels of data element 922 (e.g., the pixel that the new marker could potentially occupy is associated with data element 922 only), and if data element 922 has a pixel map value of 1, the new marker would be obscured by another marker. The new marker would be in an obscured state. As such, there is no need for the system to render the marker in the chart.

At block 816, if the marker is in an obscured state, the system does not render the marker, and the system obtains data for the next marker at block 802. If no markers are left to be rendered, the process ends.

At block 818, if the marker is not in an obscured state, the system renders the marker. The system then obtains data for the next marker at block 802. If no markers are left to be rendered, the process ends.

In some implementations, if all of the pixels become occupied, the process ends. In some implementations, if all of the pixels become occupied, the system may replace older markers (e.g., markers with stale data) with newer markers.

Using the nested pixel maps significantly reduces the computation time compared to the un-nested pixel maps. When a plot area becomes crowded and most pixels in that plot are occupied, the possibility of needing to only check the outermost pixel map significantly decrease the render time.

Various implementations are applied where the marker colors are fully opaque. In some implementations, if the markers are semi-transparent such that end users can see more than one marker in each pixel, the system may increment the map pixel value by a fraction, instead of incrementing the map pixel value by a whole number. For example, the system may increment the value by 0.25 (instead of 1) for each marker that becomes occupied. As such, in some implementations, the chart may allow the rendering of up to four markers in each pixel before the chart stops rendering in that location.

Implementations are especially useful for retained mode graphics formats such as scalable vector graphics (SVG), where each rendered object is tracked over time. By reducing the rendered objects to only those that are not obscured, features leveraging the rendered objects, such as interactivity and animation may similarly gain performance benefits. Implementations may be applied to any data visualization products that support bubble or scatter charts.

While some implementations are described herein in the context of rendering bubble charts, these implementations and others also apply to the rendering of other types of charts. For example, implementations may also apply to rendering scatter charts. Implementations described herein may be implemented using rendering engine 118 or other component(s) of software deployment system 110 of FIG. 1.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations in connection with FIG. 8 may be performed by components and/or modules of computing system 100 of FIG. 1, system 1000 of FIG. 10, system 1100 of FIG. 11, and/or network environment 1200 of FIG. 12.

Implementations described herein provide various benefits. For example, implementations use a nested pixel map to enable a chart to have O(1) rendering time for large datasets. Implementations may enable the rendering time of bubble and scatter charts to have an O(1) growth with respect to the number of data points. This means that as the number of data points increases, the rendering time of the chart will plateau after the chart is dense enough for the pixel map optimization to take effect. For example, the rendering time of 1,000,000 data points will be only slightly more than the rendering time of 100,000 data points (assuming that the 100,000 data points cover the entire plot area). The drawing time of the two charts may be substantially equal, because the chart may draw the same number of markers. The slight rendering time increase for 1,000,000 data points may be only due to more computation and data processing, which is relatively small compared to the drawing time. This may be a substantial improvement compared to the O(n) growth of conventional solutions.

Implementations may be used as a data sampling technique, further improving performance. Instead of tracking whether each pixel is obscured, a set of logical pixels consisting of a square of several pixels may be used. This would similarly filter out obscured markers, while also reducing the density of rendered objects while maintaining the overall patterns in the rendering.

FIG. 10 illustrates an example block diagram of a system 1000, which may be used for implementations described herein. In various implementations, system 1000 is an enterprise-computing environment configured to enable initial development of a dynamic business planning model 1018. In various implementations, system 1000 incrementally updates business planning model 1018 to meet specific enterprise needs, and uses resulting updated business planning model 1018 as part of a cloud-based enterprise software application or service 1054 (labeled "Cloud-Deployed Package"). While system 1000 performs implementations described herein, in other implementations, any suitable component or combination of components associated with system 1000 or any suitable module or module s associated with system 1000 may facilitate performing the implementations described herein. In various implementations, system 1000 may not have all of the components shown and/or may have other elements including other types of modules instead of, or in addition to, those shown herein.

System 1000 includes a developer computer system 1012 (labeled "Developer System(s)") that is in communication with a planning model generation framework 1014 and a model artifact constructor 1016. Computer system 1012 may also be referred to herein as the developer system or the developer computer. Model artifact constructor 1016 may leverage preexisting functionality, e.g., as may be available via a native designer in a cloud computing system implemented as part of system 1000.

Planning model generation framework 1014 and model artifact constructor 1016 that are leveraged to develop business planning model 1018, may further communicate with a packing, delivery, deployment and runtime system and/or computing framework 1020 (labeled "Packaging, Delivery, Deployment and Runtime System"). Modules 1014-1020 may be hosted in a cloud, i.e., a server system accessible via a network, such as the Internet.

A cloud-deployed package 1054, i.e., software application, embodying business planning model 1018 is may be hosted in the cloud, i.e., cloud-based. For the purposes of the present discussion, cloud-based software may be any software run on one or more servers and accessible to client systems via a network used to communicate with the software.

In some implementations, cloud-deployed package 1054 may represent a software application that may provide one or more web services for use by other software applications, and/or may provide cloud-services, e.g., on a subscription basis, to one or more client systems, e.g., a customer administrator system 1022 (labeled Customer Admin System(s), and a customer end-user system 1024 (labeled Customer End-User System(s). For the purposes of the present discussion, the term "customer" refers to any user, such as an administrator and/or end user, e.g., who may be part of an organization that has access to cloud-deployed package 1054.

In some implementations, a developer system 1012 accesses model artifact constructor 1016 and planning model generation framework 1014 via a network, such as the Internet. Developer system 1012 may include a browser used to browse to the network address that provides access to functionality provided by model artifact constructor 1016 and planning model generation framework 1014.

After browsing to a network address allotted for system developers, designers, and/or other qualified personnel, various dynamic model-building functionality is accessible to the developer system, e.g., via various developer UI display screens 1026 (labeled "Dev. UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 1018, e.g., by a developer using business planning model designer software represented by planning model generation framework 1014 and model artifact constructor 16 of FIG. 1.

In some implementations, developer UI display screens 1026 include a query-selection UI display screen (and/or set of UI controls) 1028, a feature-selection UI display screen 1030, an artifact-selection UI display screen 1032 (labeled "Artifact Selection and Mapping Opts," and an artifact and feature dependency handling UI display screen 1034.

Planning model generation framework 1014 includes a flex-dimension framework 1036, a feature-artifact mapping module 1038, a runtime model generator 1040, a dynamic functionality integrator 1042, and a UI generator 1044.

Generated, dynamic, business planning model 1018, which may be defined by and/or specified via an extensible markup language (XML) document, includes a specification 1048 (labeled "Model Specs") of business planning model 1018, and optionally, embedded question generator code (or a link to code) 1050 and answer incorporator 1052, e.g., for facilitating incorporating answers to business questions, as may be provided via the customer administrator system 1022 (labeled "System(s)," as discussed more fully below.

Packaging, delivery, deployment, and runtime system 1020 hosts and runs deployed cloud-based software package or application 1054, also referred to as "cloud-deployed package" 1054. Functionality of deployed application 1054, also referred to as "cloud-deployed package 1054," is accessible to customer end-user client system 1024.

Note that in general, groupings of various modules of system 1000 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 1050 and answer incorporator 1052 shown as part of dynamic business planning model 1018 may instead, or in addition, be incorporated into planning model generation framework 1014.

Furthermore, certain modules of planning model generation framework 1014 may be implemented client-side, e.g., on developer system 1012. In general, certain server-side, i.e., cloud-based modules (e.g., running on a server or server system) may be implemented client-side (e.g., running on a client computer communicating with a server), and vice versa, in a manner different than shown in FIG. 10.

In an example scenario, a business model developer (also called designer herein) employs developer system 1012, e.g., artifact-selection screen 1032, to specify, access, and/or configure model artifacts, leveraging model artifact constructor 1016. Artifact-selection screen 1032 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 1032 and associated model artifact constructor 1016, the resulting artifacts may be stored locally or via the server system that hosts modules 1014-1020.

Next, in the present example scenario, the developer employs feature-selection screen 1030 to select and/or configure a set of business model features. Feature construction and/or selection may also be facilitated via model artifact constructor 1016 and/or code run as part of planning model generation framework 1014, e.g., via code run on feature-artifact mapping module 1038.

After initial selection and/or configuration of a set of one or more model artifacts and one or more model features, the developer may employ one or more UI controls of artifact-selection screen 1032 to configure and/or specify initial mappings and/or associated mapping rules that define associations between the configured artifacts and features.

Artifact-selection and mapping screen 1032 may include UI controls that leverage the functionality of feature-artifact mapping module 1038 of planning model generation framework 1014. Feature-artifact mapping module 1038 may include additional code for implementing automatic feature-artifact mappings in accordance with groupings of business questions and/or answers to the business questions, e.g., so as to automatically update dynamic business planning model 1018, as discussed more fully below.

UI generator 1044 of planning model generation framework 1014 includes code for generating rendering instructions to render developer-side UI display screens 1026, and further includes code for generating rendering instructions for UI display screens of cloud-deployed package 1054, which are exposed to customer end-user system 1024.

Developer-side query-selection and layout options screen 1028 includes UI controls and access to associated functionality for defining, selecting, and/or grouping business questions (called queries) to be exposed in a UI display screen accessible to customer administrator system 1022. The UI display screens are displayed as part of the dynamic business planning model 1018 and are exposed to the customer administrator system 1022, and include a UI display screen that lists business questions that have been enabled for existing dynamic business planning model 1018.

The initial business questions selected by a developer using query-selection and layout options screen 1028 may be listed and/or otherwise formatted in accordance with developer-selected layout options provided via query-selection and layout options screen 1028. UI controls of query-selection and layout options screen 1028 provide developer-access to associated functionality (e.g., functionality which may be provided via UI generator 1044 and feature-artifact mapping module 1038 and/or other modules of planning model generation framework 1014) for defining, selecting, and/or otherwise configuring business questions and how the questions will be laid out in a UI display screen exposed to a customer administrator, e.g., via customer administrator system 1022.

Mappings of artifacts are grouped by business question or by business question group or type. Mappings of artifacts to features may depend, in part, on the business questions established via use of query-selection and layout options screen 1028.

The developer may further specify dependency-handling options via one or more UI controls provided in dependency-handling options screen 1034. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 1034) and making adjustments to the business model based thereon and in response to a detected change in an artifact, feature, question, etc.

Accordingly, developer system 1012 forwards business question selections and associated identifications, descriptions, and/or configuration information (e.g., as may be provided responsive to developer manipulation of query-selection and layout options screen 1028) to business planning model generation framework 1014. In addition, various additional UI controls included among developer UI display screens 1026 may enable specification and forwarding of additional information to planning model generation framework 1014, including, but not limited to additional business model configuration information, e.g., model artifact specifications, an artifact file listing artifacts for an initial business planning model, component (e.g., UI control) dependencies (between UI controls to be rendered and exposed via cloud-deployed package 1054), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 1014 then processes the inputs received via developer system 1012 to automatically construct an initial business planning model, also called the seed model. Some example modules usable to construct initial dynamic business planning model 1018 and to implement incremental updates thereto, include, but are not limited to flex dimension framework 1036, feature-artifact mapping module 1038, runtime model generator 1040, dynamic integrator 1042, and UI generator 1044.

Flex dimension framework 1036 includes computer code for enabling customer administrators (e.g., using customer administrator system 1022) and/or customer end users (e.g., using customer end-user system 1014) to add flex dimensions to various UI display screens exposed via cloud-deployed package 1054. Flex dimension framework 1036 then enables extension of business planning model 1018 in accordance with the added flex dimensions. Note that whether initial business planning model 1018 supports flex dimensions, which flex dimensions, if any, are supported, and behaviors of the flex dimensions, may be specified by a developer via one or more UI controls provided in developer UI display screens 1026.

Feature-artifact mapping module 1038 includes computer code for enabling automatic implementation of changes introduced to dynamic business planning model 1018 in response to answers provided in response to business questions posed to an administrator (or other authorized user) of customer administrator system 1022. In particular, when an administrator provides a new answer to a question (e.g., which may be posed via a UI prompt, such as a check box), any artifacts associated with the question are then automatically populated with features via feature-artifact mapping module 1038. The resulting populated artifacts are then incorporated into updated dynamic business planning model 1018 after any artifact and/or feature dependencies are handled and/or deltas are processed.

Runtime model generator 1040 includes computer code for automatically generating a new or updated dynamic business planning model 1018 for incorporation into cloud-deployed package 1054. The updates to running cloud-deployed package 1054 by runtime model generator 1040 may be implemented via patching and/or other known technologies for adjusting running software applications.

Dynamic integrator 1042, which may communicate with other modules of planning model generation framework 1014, facilitates implementing delta differencing processing to accommodate newly added functionality without introducing conflicts in updated business planning model 1018. Integrator 1042 may further include computer code for facilitating and/or ensuring efficient interoperability between different intercommunicating business planning models and associated software applications deployed via packaging, delivery, deployment, and runtime system 1020.

Note that information exchange between developer system 1012 and between various cloud-based modules 1014-1020 may be implemented via exchange of XML files that are also transferred between the system and modules. Furthermore, dynamic business planning model 1018 may be implemented substantially via an XML document defining the model.

In some implementations, dynamic business planning model 1018 includes a model adaptation module 1046, which includes computer code for facilitating some self-adaptation of dynamic business planning model 1018. Note that in other implementations, model adaptation module 1046 may be included instead in planning model generation framework 1014.

In some implementations, model adaptation module 1046 includes, in addition to a description of the business planning model (including a description of existing questions, artifacts, and associated features), a specification of code for dynamic question generator 1050 and answer incorporator 1052.

Dynamic question generator 1050 may include computer code (and/or links thereto) for automatically adjusting a list of business questions exposed via a UI of customer administrator system 1022, e.g., in response to one or more answers provided thereby by an administrator using customer administrator system 1022. This may be particularly useful for reconfiguring listing of displayed questions in response to an answer to a question that affects the validity of other questions displayed in (or to be displayed among) the listing of business questions.

Answer incorporator 1052 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 1022).

Note that various modules 1036-1044 of the business planning model generation framework 1014 may intercommunicate, e.g., via interfacing functionality incorporated therein. Similarly modules 1048-1052 of model adaptation module 1046 of dynamic business planning model 1018 may intercommunicate.

Once initial business planning model 1018 is developed and/or configured via developer system 1012, it can be deployed as cloud-deployed package 1054, which is then made available to customer administrator system 1022 and customer end-user system 1024. The customer administrator may then use customer administrator system 1022 to answer business questions. The resulting answers then feed back to framework modules 1014-1020, which then adapt or update dynamic business planning model 1018 in accordance with the answers. The adjustment to dynamic business planning model 1018 is effectuated through use of artifacts, which are then mapped or seeded with features corresponding to the answered questions, and in accordance with the answers to the answered questions, as discussed more fully below.

Accordingly, the present example implementation may enable customers to substantially forgo, configuring and/or updating business planning software. Several business planning processes (which may be associated with different business planning models and/or sub-models) may be selectively and incrementally rolled out to customer end users (e.g., users of customer end-user system(s) 1024). Furthermore, integration between added features (e.g., sets of software functionality associated with different business processes) is automatically accommodated, e.g., via dynamic integrator 1042 and feature-artifact mapping module 1038 of business planning model generation framework 1014.

Furthermore, by enabling customer addition of and configuration of flex dimensions to dynamic business planning model 1018, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 1000 may now readily evolve and adapt to meet different and/or changing business needs while remaining consistent with industry-standard best practices. Furthermore, as best practices change, dynamic business planning model 1018 may adapt to comply with the new best practices.

FIG. 11 illustrates an example block diagram of a system 1100, which may be used for implementations described herein. Example system 1100 is capable of supporting or running various hardware and/or software modules and associated methods discussed with reference to FIGS. 1 and 10. Note that certain implementations may be implemented using one or more standalone applications (for example, residing in a user device) and/or one or more web-based applications implemented using a combination of client-side and server-side code. While system 1100 performs implementations described herein, in other implementations, any suitable component or combination of components associated with system 1100 or any suitable processor or processors associated with system 1100 may facilitate performing the implementations described herein. In various implementations, system 1100 may not have all of the components shown and/or may have other elements including other types of components instead of, or in addition to, those shown herein.

General system 1100 includes user devices 1160-1190, including one or more desktop computers 1160, one or more notebook computers 1170, one or more smart-phones 1180, one or more mobile phones 1185, and one or more tablets 1190. General system 1100 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 1100 is shown with five user devices, any number of user devices can be supported.

A web server 1110 is used to process requests from web browsers and standalone applications for web pages, electronic documents, enterprise data or other content, and other data from the user computers. Web server 1110 may also provide push data or syndicated content, such as RSS feeds, of data related to enterprise operations.

An application server 1120 operates one or more applications. The applications can be implemented as one or more scripts or programs written in any programming language, such as Java, C, C++, C #, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 1120 are adapted to process input data and user computer requests and can store or retrieve data from data storage device or database 1130. Database 1130 stores data created and used by the data applications. In some implementations, database 1130 includes a relational database that is adapted to store, update, and retrieve data in response to SQL format commands or other database query languages. Other implementations may use unstructured data storage architectures and Not Only SQL (NoSQL) databases.

In some implementations, application server 1120 includes one or more general-purpose computers capable of executing programs or scripts. In some implementations, web server 1110 is implemented as an application running on the one or more general-purpose computers. Web server 1110 and application server 1120 may be combined and executed on the same computers.

An electronic communication network 1140-1150 enables communication between user computers 1160-1190, web server 1110, application server 1120, and database 1130. In some implementations, networks 1140-1150 may further include any form of electrical or optical communication devices, including wired network 1140 and wireless network 1150. Networks 1140-1150 may also incorporate one or more local-area networks, such as an Ethernet network, wide-area networks, such as the Internet; cellular carrier data networks; and virtual networks, such as a virtual private network.

System 1100 is one example for executing applications according to some implementations. In some implementations, application server 1110, web server 1120, and optionally database 1130 can be combined into a single server computer application and system. In further implementations, virtualization and virtual machine applications may be used to implement one or more of application server 1110, web server 1120, and database 1130.

In still further implementations, all or a portion of the web and application serving functions may be integrated into an application running on each of the user computers. For example, a JavaScript application on the user computer may be used to retrieve or analyze data and display portions of the applications.

In various implementations, system 1100 may not have all of the components shown and/or may have other elements including other types of components instead of, or in addition to, those shown herein.

With reference to FIGS. 10 and 11, developer system(s) 1012, customer administrator system(s) 1022, and customer end-user system(s) 1024 of FIG. 10 may be implemented in whole or in part via one or more of desktop computer 1160, notebook computer 1170, smartphone 1180, mobile phone 1185, and tablet 1190 of FIG. 11 and/or other computing devices such as computing system 1000 of FIG. 10. In some implementations, computing devices 1160-1190 run browsers, e.g., used to display developer UI(s) 1026 and UIs of customer administrator system(s) 1022 and customer end-user system(s) 1024 of FIG. 10.

In some implementations, browsers of systems 1012, 1022, and 1024 of FIG. 1 connect to the Internet, represented by wired network 1140 and/or wireless network 1150 as shown in FIG. 11, to access one or more network-coupled servers, databases, and/or associated cloud-based functionality, as represented by modules 1014-1020 of FIG. 10. Note that one or more of web server 1110, application server 1120, and data storage device or database 1130 shown in FIG. 11 may be used to host software corresponding to modules 1014-1020 of FIG. 10, as detailed more fully below.

In some implementations, model artifact constructor 1016, planning model generation framework 1014 (including accompanying flex dimension framework 1036, feature-artifact mapping module 1038, runtime model generator 1040, dynamic integrator 1042, and UI generator 1044), dynamic business planning module 1018 and accompanying model adaptation module 1046 (including model specifications 1048, question generator 1050, and answer incorporator 1052), and packaging, delivery, deployment, and runtime system 1020 (and accompanying cloud-deployed package 1054) of FIG. 10 run in a cloud computing environment that includes a collection of plural web servers 1110, application servers 1120, and data storage devices 1130 shown in FIG. 11.

For example, in some implementations, planning model generation framework 1014 and model artifact constructor 1016 of FIG. 10 run on a process cloud that communicates with a document cloud via an integration mechanism, e.g., middleware, APIs, web services, etc. The document cloud maintains data storage devices 1130 of FIG. 11 to maintain data that is generated by customers, e.g., via customer end-user systems 1024 of FIG. 10 through use of cloud-deployed package 1054. The process cloud in combination with the document cloud act as an overall cloud that supports development, deployment, dynamic adaptation, and use of dynamic software applications and accompanying models (e.g., dynamic business planning model 1018 of FIG. 10) shown in FIG. 10.

In general, software developers e.g., users of developer systems 1012 of FIG. 10, may subscribe to certain cloud services to facilitate development of software applications and storage of associated files. A cloud service that is configured for software application or process flow development is called a process cloud service (PCS).

A process cloud service may employ a networked database, e.g., data storage device 1130 of FIG. 11 or database 120 of FIG. 1, to store files and other objects used by a given software program being developed. Server-side development environments may be accessible to developers via browsers. The development environments may be backed by the PCS, such that developed software application files are stored in the PCS database corresponding to the one or more of data storage devices 1130 of FIG. 11 or database 120 of FIG. 1.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 1110 of FIG. 11 and supporting application code of application server 1120 of FIG. 11, where the webpage code may call the application code using web services, APIs, etc.) for generating one or more customer UI display screens, e.g., UI display screens presented via browsers of customer administrator systems 1022 and customer end-user systems 1024 of FIG. 10.

In some implementations, the UI display screens include accompanying UI controls and associated options. Example options include options to browse, create, delete, define, upload, download, etc., folders, structures, and documents, etc., as maintained via the folder structures and documents.

In some implementations, browsers used by developer system 1012, customer administrator system 1022, and customer end-user system 1024 of FIG. 10, interface with web servers 1110 shown in FIG. 11 to access web sites and accompanying webpage code, which is backed by applications used to implement modules 1016-1020 of FIG. 10. The webpage code of web servers 1110 of FIG. 11 uses web services, APIs, and/or other interfacing mechanisms to communicate with application software hosted on application servers 1120 of FIG. 11 of the cloud, which includes a collection of web servers 1110, application servers 1120, and data storage devices 1130 of FIG. 11.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-for-not possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

FIG. 12 illustrates an example block diagram of a network environment 1200, which may be used for implementations described herein. Network environment 1200 is merely illustrative and not intended to limit the scope of the claims. One of ordinary skill in the art would recognize other variations, modifications, and alternatives. For example, network environment 1200 may be implemented in a distributed client-server configuration having one or more client devices in communication with one or more server systems.

In one exemplary implementation, network environment 1200 includes a display device such as a monitor 1210, a computer 1220, a data entry interface 1230 such as a keyboard, touch device, and the like, an input device 1240, a network interface 1250, and the like. Input device 1240 is typically implemented as a computer mouse, a trackball, a track pad, wireless remote, tablet, touch screen, and the like. Moreover, input device 1240 typically allows a user to select and operate objects, icons, text, characters, and the like that appear, for example, on the monitor 1210.

Network interface 1250 may include an Ethernet card, a modem (telephone, satellite, cable, integrated services digital network (ISDN), etc.), an asynchronous digital subscriber line (DSL) unit, and the like. Furthermore, network interface 1250 may be physically integrated on the motherboard of computer 1220, may be a software program, such as soft DSL, or the like.

Network environment 1200 may also include software that enables communications over communication network 1252 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 1252 may include a local area network, a wide area network, a wireless network, an Intranet, the Internet, a private network, a public network, a switched network, or any other suitable communication network, such as for example cloud networks. Communication network 1252 may include many interconnected computer systems and any suitable communication links such as hardwire links, optical links, satellite or other wireless communications links such as Bluetooth, WIFI, wave propagation links, or any other suitable mechanisms for communication of information. For example, communication network 1252 may communicate to one or more mobile wireless devices 1256A-N, such as mobile phones, tablets, and the like, via a base station such as wireless transceiver 1254.

Computer 1220 may include familiar computer components such as one or more processors 1260, and memory storage devices, such as a memory 1270, e.g., random access memory (RAM), storage media 1280, and system bus 1290 interconnecting the above components. In one embodiment, computer 1220 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 1220 performs implementations described herein, in other implementations, any suitable component or combination of components associated with computer 1220 or any suitable processor or processors associated with computer 1220 may facilitate performing the implementations described herein. In various implementations, computer 1200 may not have all of the components shown and/or may have other elements including other types of components instead of, or in addition to, those shown herein.

Memory 1270 and Storage media 1280 are examples of non-transitory tangible media for storage of data, audio/video files, computer programs, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:
    determining a nesting depth, wherein the nesting depth represents the number of pixel maps to generate;
    generating a first pixel map for a chart, wherein the first pixel map is a first data structure that includes a first group of first data elements, wherein each first data element corresponds to a pixel of a plurality of pixels used to render the chart;
    generating at least one secondary pixel map for the chart, wherein the at least one secondary pixel map is a secondary data structure that includes a secondary group of secondary data elements, wherein each secondary data element is associated with a predetermined grouping of the first data elements, and wherein each secondary data element corresponds to a predetermined number of pixels of the plurality of pixels, and wherein the number of secondary pixel maps is determined by the nesting depth;
    determining one or more obscurity states of one or more markers of the chart, wherein each marker is associated with a separate pixel of the chart, wherein each marker indicates variable information in the chart by performing the following:
    determining obscurity states based on an outermost pixel map, wherein the outermost pixel map includes a secondary pixel map with the fewest data elements;
    determining obscurity states based on successive next outermost pixel maps until an innermost pixel map is reached or all obscurity states are determined, wherein the successive next outermost pixel map includes a secondary pixel map with the successive next fewest data elements, and where the innermost pixel map includes the first pixel map; and
    rendering one or more of the markers in the chart based on the obscurity state of each of the one or more markers.

2. The computer-readable storage medium of claim 1, wherein the chart is one or more of a bubble chart and a scatter chart.

3. The computer-readable storage medium of claim 1, wherein each marker is associated with one or more pixels that each marker would occupy if rendered in the chart.

4. The computer-readable storage medium of claim 1, wherein a particular marker is in an obscured state if all pixels associated with the particular marker are already occupied by another marker.

5. The computer-readable storage medium of claim 1, wherein the first pixel map indicates which pixels are already occupied by a marker.

6. The computer-readable storage medium of claim 1, wherein the at least one secondary pixel map indicates which groups of pixels are already occupied by a marker.

7. The computer-readable storage medium of claim 1, wherein a particular marker is rendered if the particular marker is not in an obscured state.

8. The computer-readable storage medium of claim 1, wherein the instructions when executed are further operable to perform operations comprising incrementing a pixel map value for at least one data element by a fraction after rendering at least one associated marker if the at least one associated marker is semi-transparent.

9. A method for chart rendering optimization, the method comprising:
    determining a nesting depth, wherein the nesting depth represents the number of pixel maps to generate;
    generating a first pixel map for a chart, wherein the first pixel map is a first data structure that includes a first group of first data elements, wherein each first data element corresponds to a pixel of a plurality of pixels used to render the chart;
    generating at least one secondary pixel map for the chart, wherein the at least one secondary pixel map is a secondary data structure that includes a secondary group of secondary data elements, wherein each secondary data element is associated with a predetermined grouping of the first data elements, and wherein each secondary data element corresponds to a predetermined number of pixels of the plurality of pixels, and wherein the number of secondary pixel maps is determined by the nesting depth;
    determining one or more obscurity states of one or more markers of the chart, wherein each marker is associated with a separate pixel of the chart, wherein each marker indicates variable information in the chart by performing the following:
    determining obscurity states based on an outermost pixel map, wherein the outermost pixel map includes a secondary pixel map with the fewest data elements;
    determining obscurity states based on successive next outermost pixel maps until an innermost pixel map is reached or all obscurity states are determined, wherein the successive next outermost pixel map includes a secondary pixel map with the successive next fewest data elements, and where the innermost pixel map includes the first pixel map; and
    rendering one or more of the markers in the chart based on the obscurity state of each of the one or more markers.

10. The method of claim 9, wherein the chart is one or more of a bubble chart and a scatter chart, and wherein each marker is a bubble in the bubble chart.

11. The method of claim 9, wherein each marker is associated with one or more pixels that each marker would occupy if rendered in the chart.

12. The method of claim 9, wherein a particular marker is in an obscured state if all pixels associated with the particular marker are already occupied by another marker.

13. The method of claim 9, wherein the first pixel map indicates which pixels are already occupied by a marker.

14. The method of claim 9, wherein the at least one secondary pixel map indicates which groups of pixels are already occupied by a marker.

15. The method of claim 9, wherein a particular marker is rendered if the particular marker is not in an obscured state.

16. The method of claim 9, further comprising incrementing a pixel map value for at least one data element by a fraction after rendering at least one associated marker if the at least one associated marker is semi-transparent.

17. An apparatus comprising:
one or more processors; and
logic encoded in one or more non-transitory computer-readable storage media for execution by the one or more processors and when executed operable to perform operations comprising:
determining a nesting depth, wherein the nesting depth represents the number of pixel maps to generate;
generating a first pixel map for a chart, wherein the first pixel map is a first data structure that includes a first group of first data elements, wherein each first data element corresponds to a pixel of a plurality of pixels used to render the chart;
generating at least one secondary pixel map for the chart, wherein the at least one secondary pixel map is a secondary data structure that includes a secondary group of secondary data elements, wherein each secondary data element is associated with a predetermined grouping of the first data elements, and wherein each secondary data element corresponds to a predetermined number of pixels of the plurality of pixels, and wherein the number of secondary pixel maps is determined by the nesting depth;
determining one or more obscurity states of one or more markers of the chart, wherein each marker is associated with a separate pixel of the chart, wherein each marker indicates variable information in the chart by performing the following:
determining obscurity states based on an outermost pixel map, wherein the outermost pixel map includes a secondary pixel map with the fewest data elements;
determining obscurity states based on successive next outermost pixel maps until an innermost pixel map is reached or all obscurity states are determined, wherein the successive next outermost pixel map includes a secondary pixel map with the successive next fewest data elements, and where the innermost pixel map includes the first pixel map; and
rendering one or more of the markers in the chart based on the obscurity state of each of the one or more markers.

18. The apparatus of claim 17, wherein the chart is a bubble chart, and wherein each marker is a bubble in the bubble chart.

19. The apparatus of claim 17, wherein each marker is associated with one or more pixels that each marker would occupy if rendered in the chart.

20. The apparatus of claim 17, wherein a particular marker is in an obscured state if all pixels associated with the particular marker are already occupied by another marker.

* * * * *

UNITED STATES PATENT AND TRADEMARK OFFICE
CERTIFICATE OF CORRECTION

PATENT NO. : 10,692,253 B2
APPLICATION NO. : 15/476802
DATED : June 23, 2020
INVENTOR(S) : Ho et al.

Page 1 of 1

It is certified that error appears in the above-identified patent and that said Letters Patent is hereby corrected as shown below:

In the Specification

In Column 5, Line 43, delete "run-time" and insert -- runtime --, therefor.

In Column 22, Line 33, delete "C #," and insert -- C#, --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*